(12) United States Patent
Kraft et al.

(10) Patent No.: US 7,930,205 B2
(45) Date of Patent: *Apr. 19, 2011

(54) SYSTEM AND METHOD FOR ENHANCING SALES FOR SERVICE PROVIDERS BY UTILIZING AN OPPORTUNISTIC APPROACH BASED ON AN UNEXPECTED CHANGE IN SCHEDULE OF SERVICES

(75) Inventors: Reiner Kraft, Gilroy, CA (US); Joann Ruvolo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 709 days.

This patent is subject to a terminal disclaimer.

(21) Appl. No.: 11/931,577

(22) Filed: Oct. 31, 2007

(65) Prior Publication Data

US 2008/0059289 A1      Mar. 6, 2008

Related U.S. Application Data

(63) Continuation of application No. 09/768,458, filed on Jan. 25, 2001, now Pat. No. 7,337,125.

(51) Int. Cl.
*G06F 17/30* (2006.01)
(52) U.S. Cl. ............................................. 705/10; 705/26
(58) Field of Classification Search .................... 705/26, 705/27, 10
See application file for complete search history.

(56) References Cited

U.S. PATENT DOCUMENTS

| | | | |
|---|---|---|---|
| 5,615,121 A | 3/1997 | Babayev et al. | |
| 5,948,040 A | 9/1999 | DeLorme et al. | |
| 5,953,706 A | 9/1999 | Patel | |
| 6,026,375 A | 2/2000 | Hall et al. | |
| 6,041,308 A | 3/2000 | Walker et al. | |
| 6,134,534 A | 10/2000 | Walker et al. | |
| 6,249,767 B1 | 6/2001 | Okayama et al. | |
| 6,304,850 B1 | 10/2001 | Keller et al. | |
| 6,314,361 B1 * | 11/2001 | Yu et al. | 701/120 |
| 6,360,205 B1 | 3/2002 | Iyengar et al. | |
| 6,381,465 B1 | 4/2002 | Chern et al. | |
| 6,381,578 B1 | 4/2002 | DeMarcken | |
| 6,408,278 B1 | 6/2002 | Carney et al. | |
| 6,446,045 B1 | 9/2002 | Stone et al. | |
| 6,510,418 B1 | 1/2003 | Case et al. | |
| 6,553,350 B2 | 4/2003 | Carter | |
| 6,662,195 B1 | 12/2003 | Langseth et al. | |
| 6,675,151 B1 * | 1/2004 | Thompson et al. | 705/9 |

(Continued)

OTHER PUBLICATIONS

"St. Louis Airport Offers Extras to Entertain Captive Audience." Ken Leiser, Knight-Ridder/Tribune Business News, Nov. 25, 1998. Retrieved via Dialog on Dec. 5, 2010.*

(Continued)

*Primary Examiner* — Michael A. Misiaszek
(74) *Attorney, Agent, or Firm* — IP Authority, LLC; Ramraj Soundararajan

(57) ABSTRACT

Sales associated with service providers is increased using an opportunistic approach based on an unexpected change in a schedule or services (time, location). Windows of opportunity (time, physical location) are automatically identified, and once such a window of opportunity is detected, the people affected directly from the change of a schedule are identified. This information is then used by services providers to act quickly, in order to enhance sales. Heuristics to determine a window of opportunity are based only on schedule changes (which are associated with a rule database), and without knowing who the affected people are or what their preferences (profile data) are.

15 Claims, 10 Drawing Sheets

U.S. PATENT DOCUMENTS

| | | | |
|---|---|---|---|
| 6,732,080 B1 * | 5/2004 | Blants | 705/9 |
| 6,759,960 B2 * | 7/2004 | Stewart | 340/573.1 |
| 6,810,527 B1 | 10/2004 | Conrad et al. | |
| 6,842,737 B1 * | 1/2005 | Stiles et al. | 705/6 |
| 2001/0032121 A1 | 10/2001 | Le | |
| 2001/0037250 A1 | 11/2001 | Leftkowitz | |
| 2001/0037405 A1 * | 11/2001 | Sideek | 709/246 |
| 2002/0016723 A1 * | 2/2002 | Matsui et al. | 705/6 |
| 2002/0052778 A1 | 5/2002 | Murphy et al. | |
| 2002/0057212 A1 | 5/2002 | Hamilton et al. | |
| 2002/0069093 A1 | 6/2002 | Stanfield | |
| 2002/0082912 A1 | 6/2002 | Batachia et al. | |
| 2002/0095327 A1 | 7/2002 | Zumel et al. | |
| 2002/0166127 A1 | 11/2002 | Hamano et al. | |
| 2002/0184059 A1 | 12/2002 | Offutt et al. | |
| 2003/0014318 A1 | 1/2003 | DeLa Motte | |

OTHER PUBLICATIONS

Leiser, Ken, "St. Louis Airport Offers Extras to Entertain Captive Audience," Knight-Ridder/Tribune Business News, Nov. 25, 1998, retrieved via Dialog, 2pgs.

* cited by examiner

Flight status (602)

- Flight number (606): 160
- Departure date: 10/04/2000
- Check

Quick fare finder (604)

- From
- To
- Departure date: Oct 5 Anytime
- Return: Oct 5 Anytime
- Number of Passengers: 1
- Check
- Full flight search

FIG. 6

Flight number: 160
Departure Date: Oct 05, 2000

Status: Not Departed

| Departure | Arrival |
|---|---|
| Airport: San Francisco, CA (SFO)<br>Time: 8:00 am (10 minutes early)<br>Gate: 73<br>Reason: Flight is on time. | Airport: Boston, MA (BOS)<br>Time: Estimated Arrival 4:12 pm (33 min Early)<br>Gate: C25<br>Reason: Flight time changed due to airport operations.<br>Baggage Claim: N/A |

SYSTEM AND METHOD FOR ENHANCING SALES FOR SERVICE PROVIDERS BY UTILIZING AN OPPORTUNISTIC APPROACH BASED ON AN UNEXPECTED CHANGE IN SCHEDULE OF SERVICES

RELATED APPLICATIONS

This application is a continuation of U.S. application Ser. No. 09/768,458, filed Jan. 25, 2001, pending.

BACKGROUND OF THE INVENTION

1. Field of Invention

The present invention relates generally to the field of electronic commerce. More specifically, the present invention is related to enhancing sales for service providers by utilizing an opportunistic e-commerce approach based on an unexpected change in the schedule of services (time, location).

2. Discussion of Prior Art

There has been a steady increase in the speed and ease with which business transactions are carried over a network such as, but not limited to, wide area networks (WANs), local area networks (LAN's), or the world wide web (WWW). Systems based on networks listed above deal with a plethora of information available in various formats (e.g., documents, images, sounds, etc.) A significant focus in recent e-commerce activities revolves around optimization solutions with the end-user as the center of the focus. One common challenge associated with such e-commerce systems is whether or not they are able to filter out relevant or pertinent information that benefits the end-user. Many filtering techniques utilize data extraction as a method to filter out unnecessary documents (or data) and provide only relevant or pertinent information that is beneficial from the end-user's perspective. Data extraction is accomplished in many systems via a method often referred to as data mining.

Data mining involves a class of database applications that look for hidden patterns in a data set. For example, data mining software helps retail companies find customers with common interests. Data mining is commonly misused to describe software that presents data in new ways. True data mining software does not just change the presentation, but discovers previously unknown relationships among the data. In data mining, data is collected at the server-side, client-side, proxy servers, or obtained from a database usually.

Data extracted via data mining fall under many different categories, one common category being web pages that are accessed by end-users via an interface (e.g., browsers like Netscape Navigator® or Internet Explorer®). In general, web pages usually contain, but are not limited to, textual and/or graphical data. One common problem associated with data extracted from web pages is that there is no standard format associated with this data. This is a significant problem encountered by data mining software, since in most cases it is not able to analyze the extracted data in a logical way.

FIG. 1 illustrates an example of how lack of a specific data format affects data mining software applications. Data mining software 100 requests web page 102 (from service provider 103 via network 104) regarding information (e.g., location and time) concerning an event. When data mining software 100 receives web page 102, information regarding the time 106 and location 108 of a specific event is not in any standardized format and therefore requires data mining software to go through an entire document to extract and apply certain predetermined rules to extract these values. A predefined data format makes data extraction easy for the data mining software. One such attempt at standardization of data, more specifically calendar data, is the iCalendar specification.

The Internet Calendaring and Scheduling Core Object Specification (iCalendar) provides a definition of a common format for openly exchanging calendaring and scheduling information across the Internet. The iCalendar specification defines the format of calendar objects, e.g., components, properties. The components are collections of properties which specify an event, a to-do, a journal entry, free/busy time information, time zone information, or an alarm entered into a calendar. While, the iCalendar specification contains a separate event component, the "calendar event" of the current invention is broadly defined as synonymous with a calendar component, i.e., a calendar event encompasses not only an event, but also includes a to-do, a journal entry, etc.

It should be noted, the iCalendar specification was first presented as RFC 2445 (Request For Comment 2445), and as is typical with RFCs continues to be a work in progress and may change over time. However, it is within the spirit of the present invention to utilize the original iCalendar specification, any subsequent modifications thereof, or any other future calendaring format protocols. Additionally, the original iCalendar specification can be located at any RFC archive, such as http://www.faqs.org/rfcs/rfc2445.html.

Thus, the iCalendar format is suitable as an exchange format between applications or systems. The format is defined in terms of a MIME content type. This will enable the object to be exchanged using several transports, including but not limited to SMTP, HTTP, a file system, desktop interactive protocols such as the use of a memory-based clipboard or drag/drop interactions, point-to-point asynchronous communication, wired-network transport, or some form of wireless transport such as infrared might also be used.

One area in which iCalendar data is used is to record event information, e.g., a specific event location and time. This iCalendar information provides emerging Internet and e-commerce technologies valuable information that can be extracted relatively easily. Today's personalized advertising and direct marketing provides benefit extensively from such information, and furthermore data mining is more efficient if data mining software is able to extract formatted data (like iCalendar data).

Along with the advent of personal digital assistants (PDA's) with network connectivity (more specifically Internet connectivity), cellular web telephones with integrated global positioning service (GPS) receivers, etc., there are new opportunities to enhance marketing communication and resulting sales. However, none of the prior art systems utilize an opportunistic approach based on an unexpected change in the schedule of services (time, location), which results in blocking of dependents.

Whatever the precise merits, features and advantages of the above cited references, none of them achieve or fulfills the purposes of the present invention. These and other objects are achieved by the detailed description that follows.

SUMMARY OF THE INVENTION

The present invention provides for a system comprising: (a) a service provider schema database storing schema descriptions associated with a plurality of data sources, wherein a schema description is associated with a particular data source and identifies data structure and format associated with that particular web based data source; (b) a cookie crawler simulating user interactions and extracting data from one or more data sources over a network, wherein data extractions are based on stored schema descriptions stored in the service provider schema database; (c) an event retriever receiving extracted data from the cookie crawler and generating an event pair which comprises a target time value and an actual time value associated with a schedule of service; (d) an event observer, the event retriever receiving the event pairs from the event retriever, calculating the difference between the actual and target time values, and based on one or more rules from a first set of rules, identifying and notifying a window of opportunity detector regarding potential windows of opportunities, wherein each potential window of opportunity defines a time period of customer inactivity; and (e) the window of opportunity detector receiving the potential windows opportunities and detecting, based on one or more rules from a set of second rules, if a window of opportunity exists, and if so, matching the detected windows of opportunities with service providers for the purposes of providing a new product or a service separate from the scheduled service.

The present invention also provides for a method comprising the steps of: (a) storing schema descriptions associated with a plurality of data sources, wherein a schema description is associated with a particular web based data source and identifies data structure and format associated with that particular web based data source; (b) simulating user interactions and extracting data from a particular data source over a network, wherein data extractions are based on a stored schema description associated with the particular data source; (c) generating an event pair from the extracted data, the event pair comprising a target time value and an actual time value associated with a schedule of service; (d) calculating the difference between the actual and target time values, and based on one or more rules from a first set of rules, identifying potential windows of opportunities, wherein each potential window of opportunity defines a time period of customer inactivity; (e) detecting, based on one or more rules from a set of second rules, if a window of opportunity exists, and if so, matching the detected window of opportunity with service providers for the purposes of providing a new product or a service separate from the scheduled service.

The present invention also provides for an article of manufacture comprising computer usable medium having computer readable program code embodied therein which implements the above-described method.

BRIEF DESCRIPTION OF THE DRAWINGS

FIG. 6 illustrates a web page manipulated by the mining software or a enhanced gatherer/crawler.

FIG. 7 illustrates a web page sent in response to a query by the mining software or a enhanced gatherer/crawler.

DESCRIPTION OF THE PREFERRED EMBODIMENTS

Figure 1:
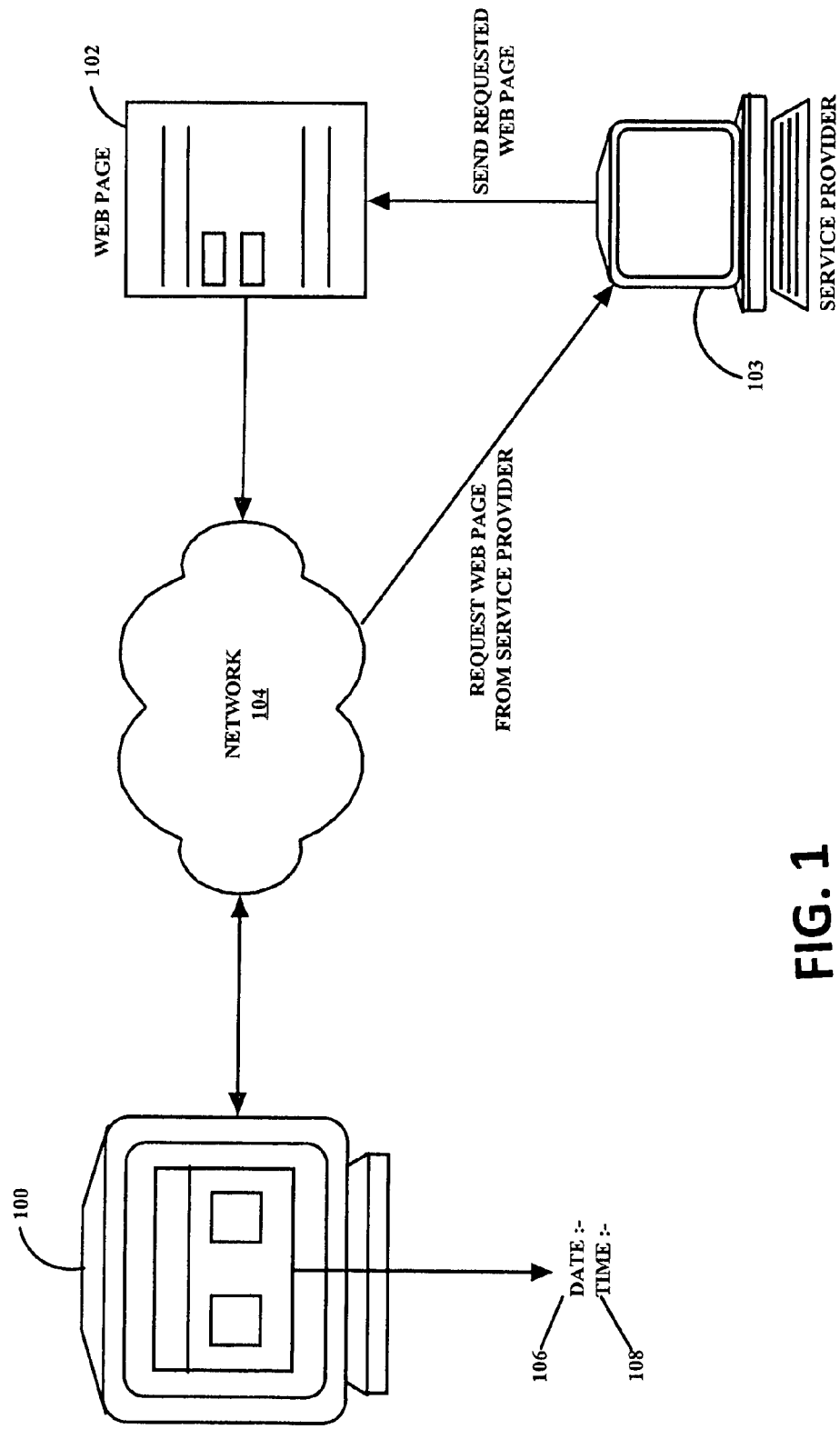
FIG. 1 illustrates how data mining software applications are affected by a lack of specific data format.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Personalized advertising and direct marketing are becoming more sophisticated. However, current advertising and marketing strategies do not enjoy all the benefits from new emerging Internet and e-commerce applications and technologies. More data is being accessed over the web, and this data can be automatically retrieved and processed by software agents (e.g., data mining), and used for business intelligence and various other purposes. Wireless PDAs with Internet connectivity, cellular web phones with integrated GPS receivers, etc., provide new opportunities to enhance marketing communication and resulting sales; but, none utilize new Internet-based technologies and communication to generate additional sales for service providers.

One fundamental aspect of the present invention is to determine a so called "window of opportunity". An example of determining a window of opportunity is an unexpected change in schedules of public services. For example, consider a train, which is scheduled to leave at 7:00 A1, but due to unknown circumstances the schedule is changed to 7:45 AM. There is a good chance that there are people who use this train to commute to work, and were not informed in time about this unexpected schedule change event. Most of these people probably will decide to wait there until 7:45 AM, instead of investigating alternatives. But, it would be desirable to have a system, which would identify these unexpected events as "window of opportunities". This information could then be used by service providers to deliver useful services to these waiting people in order to help them satisfy their demands or utilize their blocked time. Hence, service providers like food delivery services, newspaper delivery services, taxicab services, etc., utilize a opportunistic approach to deliver useful services for these waiting people in order to help them satisfy demands (e.g., deliver food) or utilize their blocked time (e.g., sell a magazine, provide entertainment, etc.)

The present invention increases the likelihood of a sale for a service provider by automatically identifying windows of opportunities (time, physical location), and then leveraging this information. Events of desire are primarily changes in schedules of public/private service providers (trains, planes, buses, etc.) or other publicly known events (e.g., rock concerts, art performances, etc.). However, one skilled in the art will realize that the invention need not be limited to these events. There might be more interesting events, where an unexpected change in schedules might be beneficial for other service providers. More generally, whenever there's an unexpected change in a schedule, and one or more people (dependants) might be affected from this change, such that they are blocked (e.g., have to wait, cannot engage in other activities), the present invention defines this event as a "window of opportunity". The notion of blocking is an important aspect of the present invention. Otherwise, in a non-blocking scenario people might be able to engage in alternative activities, and thus with respect to these people, there is no window of opportunity. Continuing with the train example above, the unexpected change of the train schedule will affect people who weren't aware of this schedule change. These people tried to catch the 7:00 AM train, and most of them might now be in a "blocked" state until 7:45 AM (when the train eventually arrives). Some of the reasons they could be in a blocking state are given below:

a) They weren't informed about the schedule change in time (unexpected event).

b) Alternatives (e.g., other means of transportation) might be not available, or too expensive.

c) There's not enough time during the delay of the desired service to engage in different activities.

The key to being blocked is the change of schedule and the inability or lack of resources to deal with it (e.g., an extra hour on the train with nothing to read). Being uninformed contributes to the opportunity, though it is not a necessary condition. For example, a person might have to take two trains to get to a sporting event. Even though that person might know that the second train is going to be late, the person still might have no other alternative but to take the first train and wait that extra time for the second train. So even though the person may be informed of the unexpected delay, there is still an opportunity to engage them in a marketing communication and/or sale.

All the above discussion involves the determination of a window of opportunity which is triggered by an unexpected change in a schedule or route of a service. A window of opportunity is also possible when there is no schedule to adhere to though there is a delay. The following examples illustrate a few possibilities:

a) A service scheduled for a specific time has an unexpected time delay. For instance, a train is running late and the passengers have to wait.

b) A service scheduled for a specific time will be provided earlier than anticipated. For instance plane leaves earlier than expected. The passengers who missed this plane will have to wait for the next plane.

c) A service scheduled to take a designated physical route will take a detour, or some other unexpected route. For instance, a bus will travel to city B, instead to city A. The passengers have to then cancel the trip, or seek alternative means of transportation, and then have to wait for the alternative transportation means to arrive.

d) Commuters are driving home one night over a bridge. There is a major accident, resulting in all lanes being blocked, and the passengers have to wait.

Overall, the system of the present invention will detect schedule changes which might introduce blocking for some dependants of the event, thus introducing new "windows of opportunities."

Figure 2:
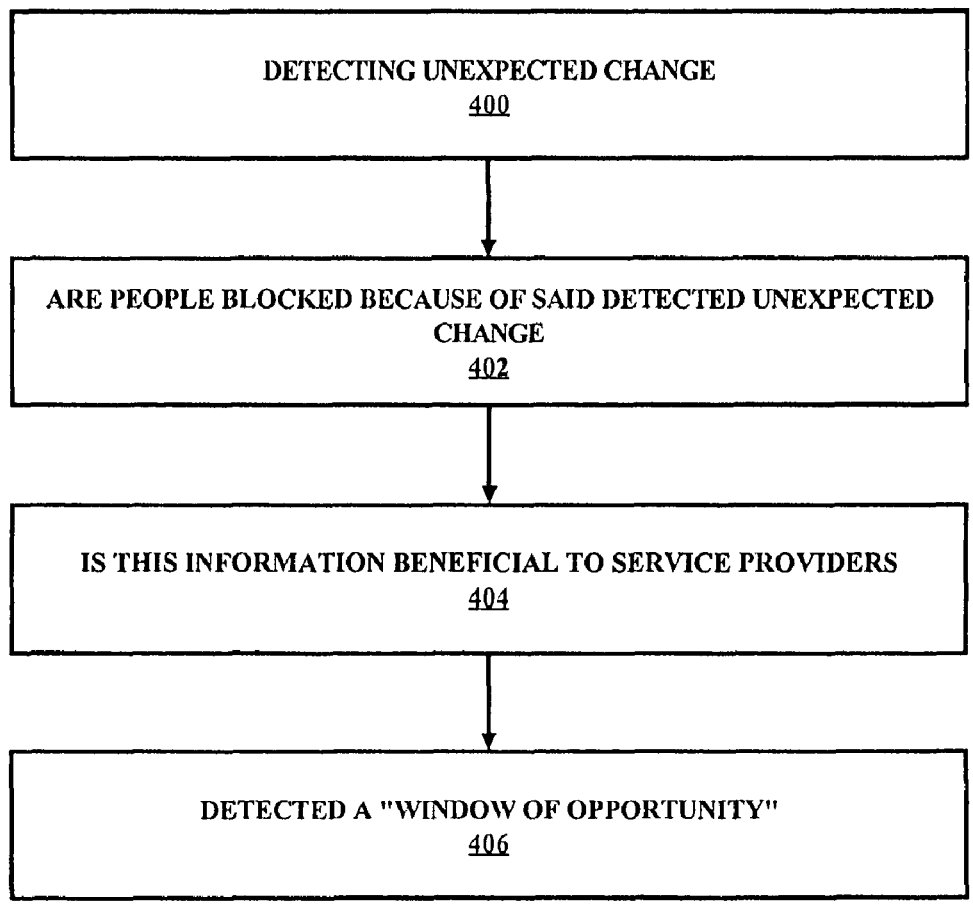
FIG. 2 generally illustrates the present invention's method of "window of opportunity".

FIG. 2 generally illustrates the method of "window of opportunity". First, the present invention, detects any unexpected change in schedules 200. Next, the system determines whether or not the people affected by this change are blocked by said detected change 202. If affected people are blocked, then the system determines if this information is beneficial to any service provider 204. The system detects a "window of opportunity" 206, if the information is in fact beneficial to at least one service provider.

Once such a window is detected, there are several possibilities. First, in a preferred embodiment, the invention will determine what type of service provider might benefit from this information. Second, the invention might determine whether people are affected directly from the change of schedule. This information is then be used by these service providers to act quickly, in order to enhance sales. Note that this approach does not need to know who the affected people are, nor their preferences (profile data), although it does not exclude this information. The heuristics to determine a window of opportunity are only based on schedule changes, which are associated with a rules database.

Figure 3:
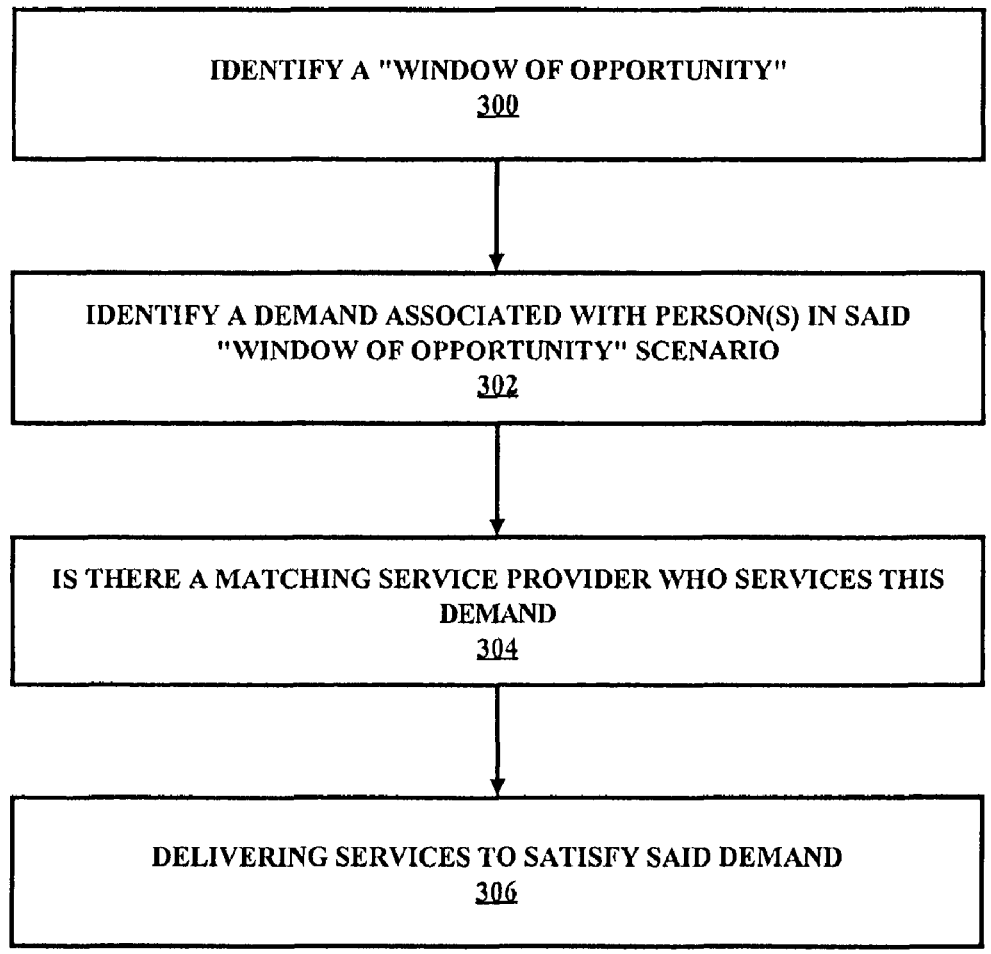
FIG. 3 illustrates an overview of the preferred embodiment of the method for enhancing sales for service providers by utilizing an opportunistic approach based on an unexpected change in the schedule of services.

FIG. 3 illustrates an overview of the above-described preferred embodiment. After identifying a "window of opportunity" 300, the system identifies a demand 302 associated with the persons affected by the "window of opportunity." Next, the system matches service providers 304 that satisfy this demand, and if a match is found, the services are delivered to satisfy the demand 306.

Further embodiments of the present invention include:

1) As an extension of the preferred embodiment, users are able to download services when entering a certain predetermined area. A button on the portable device is associated with ordering such a service. Once this button is pressed, services "come" to the user.

2) In yet another embodiment, consumers locate mobile service providers within an area-surrounding them along with an estimate of distance/time between service providers and themselves. Consumers then make a determination whether they should wait for mobile service provider, head off towards a mobile service provider, or go for a traditional bricks and mortar service provider. As an example, a consumer who is "blocked" and is affected by a "window of opportunity" at an arena during a football game is able to determine (and locate) whether or not a service provider (e.g., hot dog vendor) is near the consumer.

Hence, the present invention provides a very valuable framework for detecting "windows of opportunities." It utilizes emerging Internet technologies, and provides a basis for service providers to take advantage of these opportunities, which will likely translate into additional sales.

Figure 4:
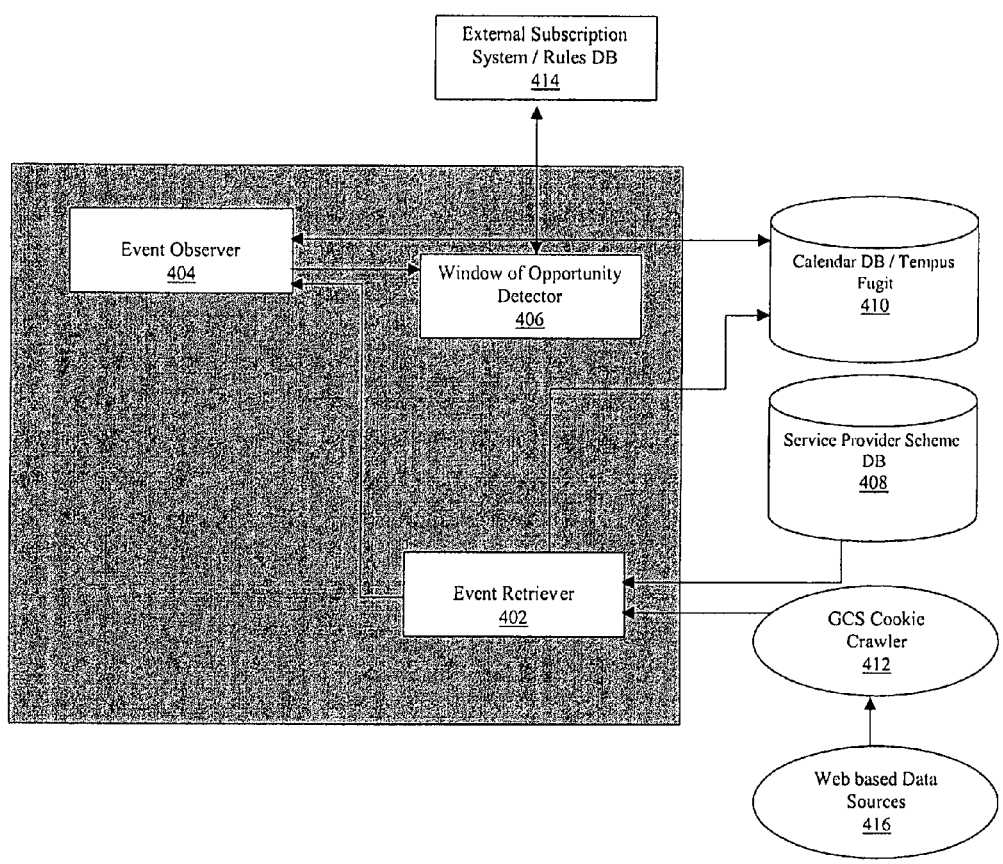
FIG. 4 illustrates the preferred embodiment of the system for enhancing sales for service providers by utilizing an opportunistic approach based on an unexpected change in the schedule of services.

As illustrated in FIG. 4, the preferred embodiment of the system 400 comprises the following components:

a) Event retriever 402
b) Event observer 404
c) Window of opportunity detector 406
d) Service provider schema database 408

In addition, there are external components:

e) Calendaring system or a calendar management system 410
f) Cookie crawler 412

However, it should be noted that one skilled in the art can recognize that these external components can be replaced by other components, which provide a similar functionality. A brief description of each of the above essential system components (a-d) are given below:

Event Retriever

Figure 5:
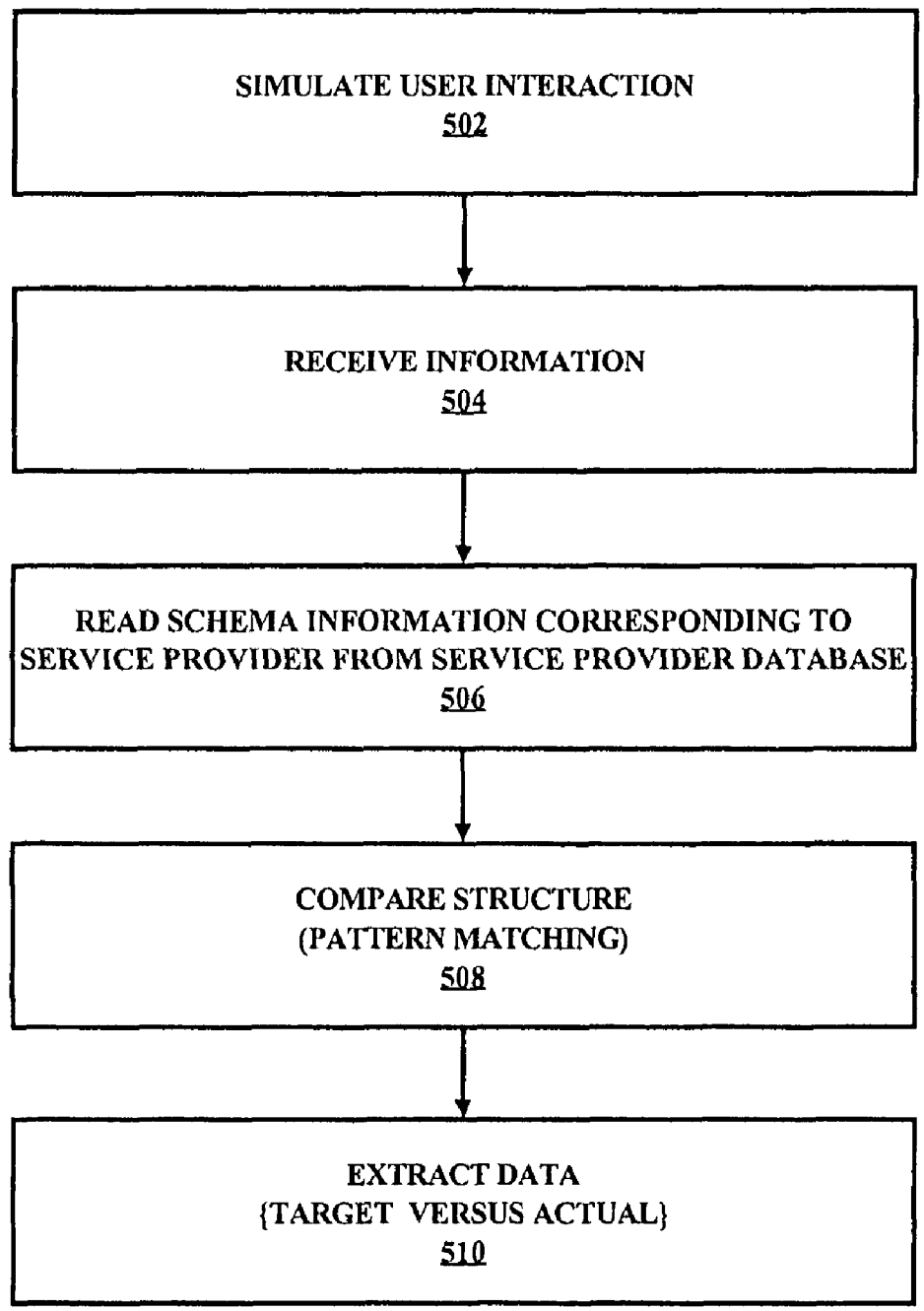
FIG. 5 illustrates a detailed description of the method associated with event retriever described in FIG. 4.

This component manages the retrieval of event data from web based data sources. A web based data source for instance could be the flight schedule of an airline, train, etc. Almost all major service providers have web based access to their schedules, providing up to the minute data of their current schedules. FIG. 5 illustrates a detailed description of the method associated with the event retriever described in FIG. 4. First, using enhanced web crawling mechanisms, and by simulating user interaction 502 (such as a cookie crawler 412), the data is extracted from web based data sources 416. From such a web based data source 416, a schema description, which describes their structure and format, is received so that the crawler component knows how to extract the relevant event data. For example, the event data might be hidden in HTML tables or forms. The associated service provider schema database 408 then stores the correspondent schema information (e.g., in the form of a document type definition [DTD] or another schema description language [XML Schema]). In another embodiment, there is a subscription management component 414, where events and schedules to be tracked are defined. For example, consumers only interested in flights from a certain airline, can enter the airline whose events need to be tracked.

The goal of the Event Retriever is to generate an event pair of the form (target date/actual date). For example, this event pair comprises the following two iCalendar events:

target date/time of event (the time something is scheduled)
actual date/time of event (the actual time something is performed)

The retrieval of the target date/time of the event is mostly a straightforward process, utilizing extraction based on pattern matching. However, sometimes the extraction of the event date/time might be a bit more challenging. If the data is represented using a relative value (e.g., "20 minutes delay"), around with some additional text, data extraction will be more difficult. Since the schema database of the service provider is created manually, these situations have to be entered as additional extraction rules. Then, the necessary information for the transcoding is retrieved from the schema database when it is needed. Thus, the date and time are available in an absolute or standard notation.

In the preferred embodiment, the extraction process of the present system simulates user interaction 502 and utilizes software such as, but not limited to, data mining software to request data. The process then receives the requested data 504. Next, the schema information corresponding to the specific service provider is extracted 506 from the service provider database. A comparison or pattern matching step is then initiated 508, and based on the result the system, extracts necessary data 510.

The following example, as illustrated in FIG. 6, describes the extraction process of retrieving an event pair (time, location) associated with a specific airline. The steps associated with the extraction process are outlined below:

Step 1: A mining software or an enhanced gatherer/crawler requests the URL from ABC airlines at http://www.XYZ.com. The page contains forms 602, 604, where the enhanced crawler will insert the particular flight number the system is interested in, for instance "160" is inserted in field 606. The crawler will simulate a user submitted form by sending an HTTP POST request, containing the requested flight data.

Step 2: As a result, the flight data for flight 160 will be returned (see FIG. 7). Using pattern matching, and applying extraction based on the rules and information in the service provider schema database, the gatherer will extract the target data/time, and convert it into standard or absolute date/time values, which will be, in this example, Oct. 5, 2000 at 8:10 AM and the actual date/time, which will be Oct. 5, 2000 at 8:00 AM.

Once the extracted event data is standardized, the event retriever will combine the data (e.g. using iCalendar standard) into an event pair (planned/actual), and forward it to the event observer for further processing.

In the particular example above, there will be two event pairs: First, there's one pair for the departure in San Francisco, Calif. (8:10 AM/8:00 AM). Second, there's a second pair for the arrival in Boston, Mass. (3:39 PM/4:12 PM). As mentioned earlier, a subscription mechanism could be integrated in the event retriever, to discard particular events. In our example, consumers might want to discard the second event pair, since they are not interested in events of Boston.

In a further embodiment, the event retriever receives data from a standard calendaring system, using the iCalendar standard for data exchange. This would facilitate event input, since the data arrives already in a standardized way, and no extraction is necessary.

Figure 8:
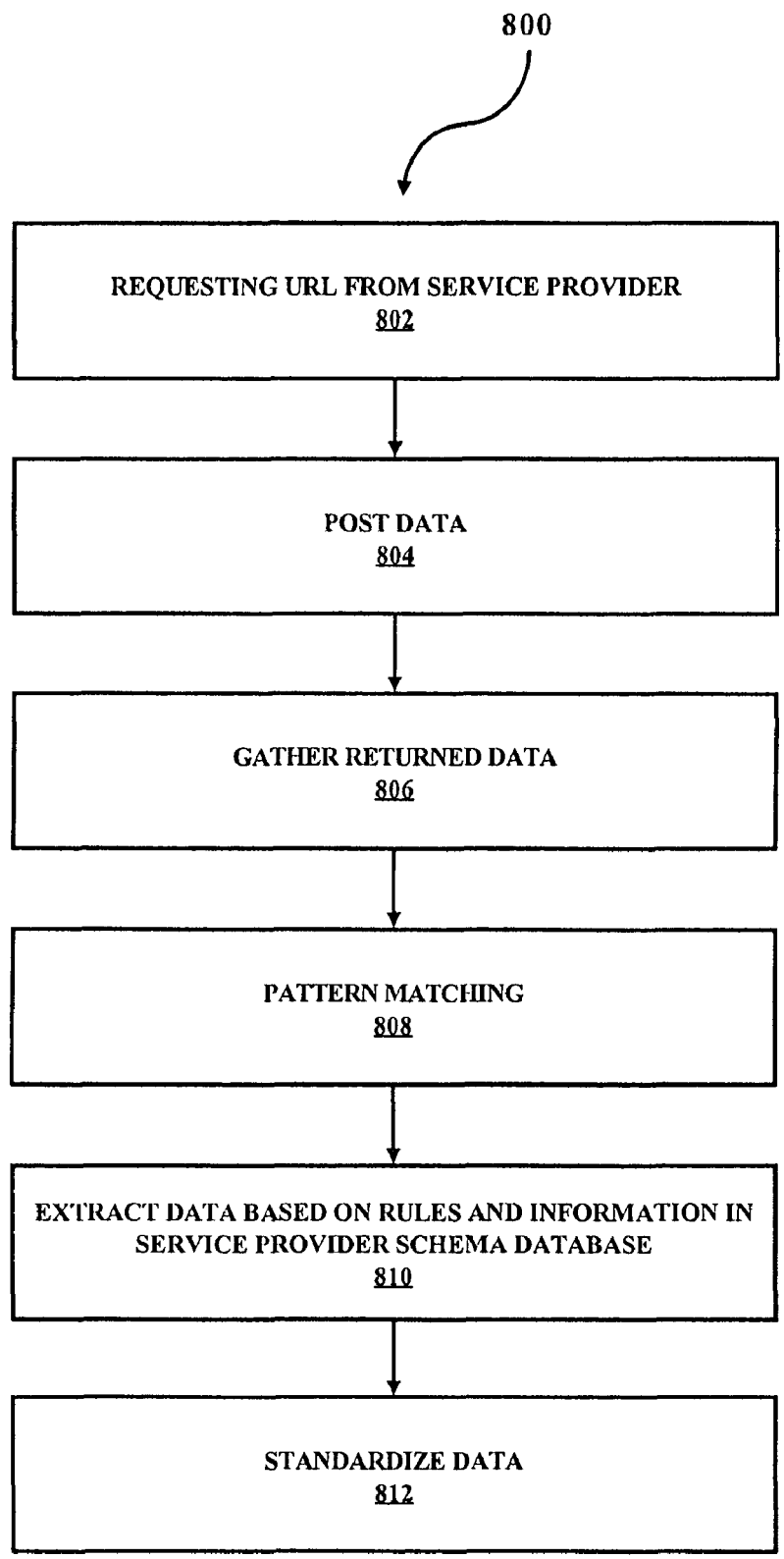
FIG. 8 illustrates the method of data extraction.

FIG. 8 illustrates the method of data extraction 800 in general. First, a request is made for a URL from a service provider 802 and once the requested webpage (with forms) is received, an enhanced gatherer posts data 804 in the respective form(s) of the web page. Next, data is gathered 806 from the service providers and a pattern matching step is initiated 808. Lastly, data is extracted based on rules and information in the service provider schema database 810, and the extracted data is then standardized 812 and passed on to the event observer.

Event Observer

Figure 9:
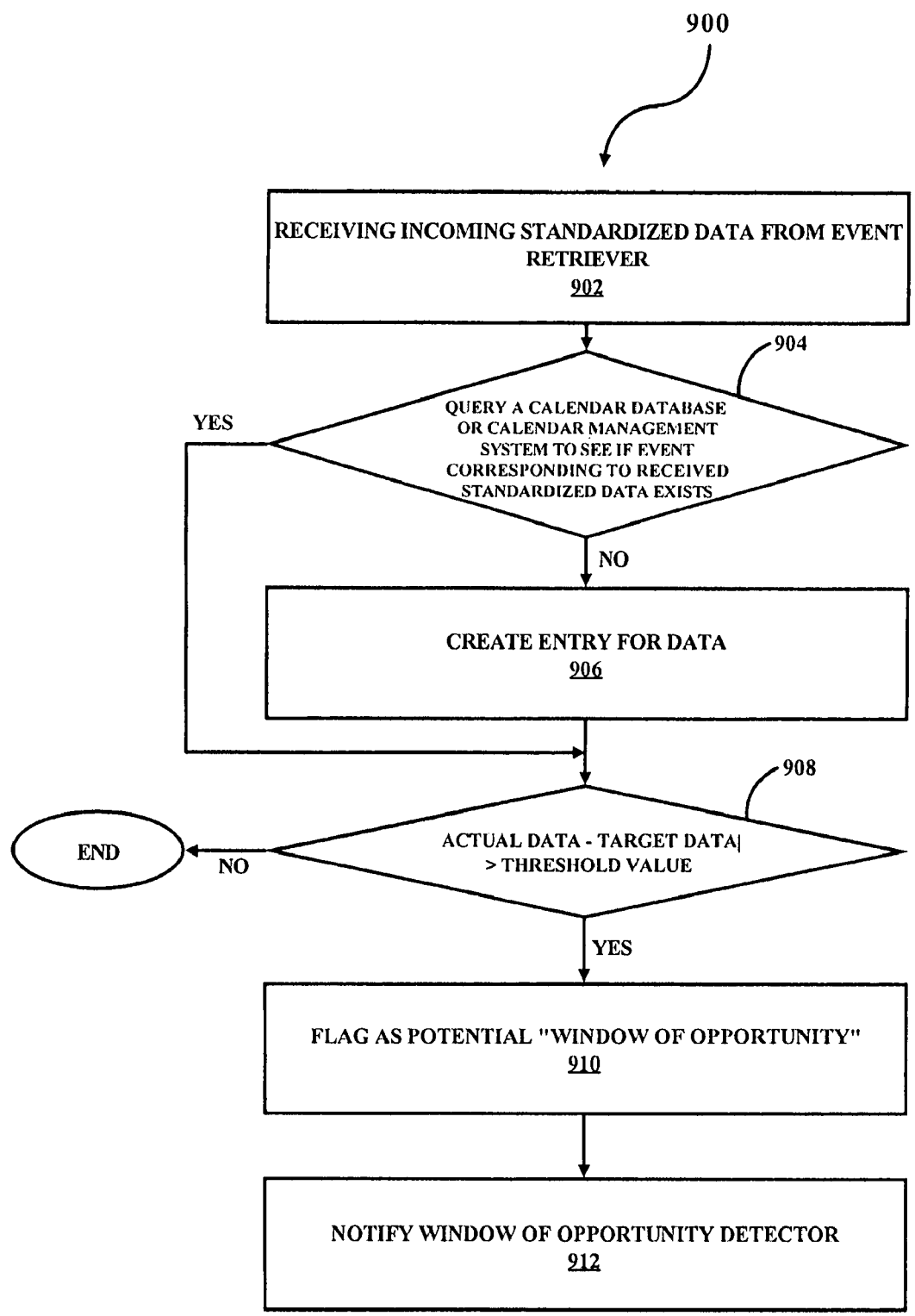
FIG. 9 illustrates the method associated with the event observer.

FIG. 9 illustrates event observer method 900. This component will receive incoming calendar event pairs (target data/actual date) 902 from the event retriever component. It will query the calendar database or calendar management system 904, using the received iCalendar target event as a key to identify, whether this calendar event already exists. If it does not exist, it will create it 906. Next, the event observer examines the actual date. If for an event the difference of the actual date and the target date is greater then a threshold value (e.g. 30 minutes) 908, the calendar event entry will be flagged as a potential candidate 910 for a window of opportunity, and the window of opportunity detector will be notified about this 912.

The overall task of the event observer therefore is to receive incoming event pairs, calculate the difference between actual and planned time, and notify the window of opportunity detector about this.

Window of Opportunity Detector

Figure 10:
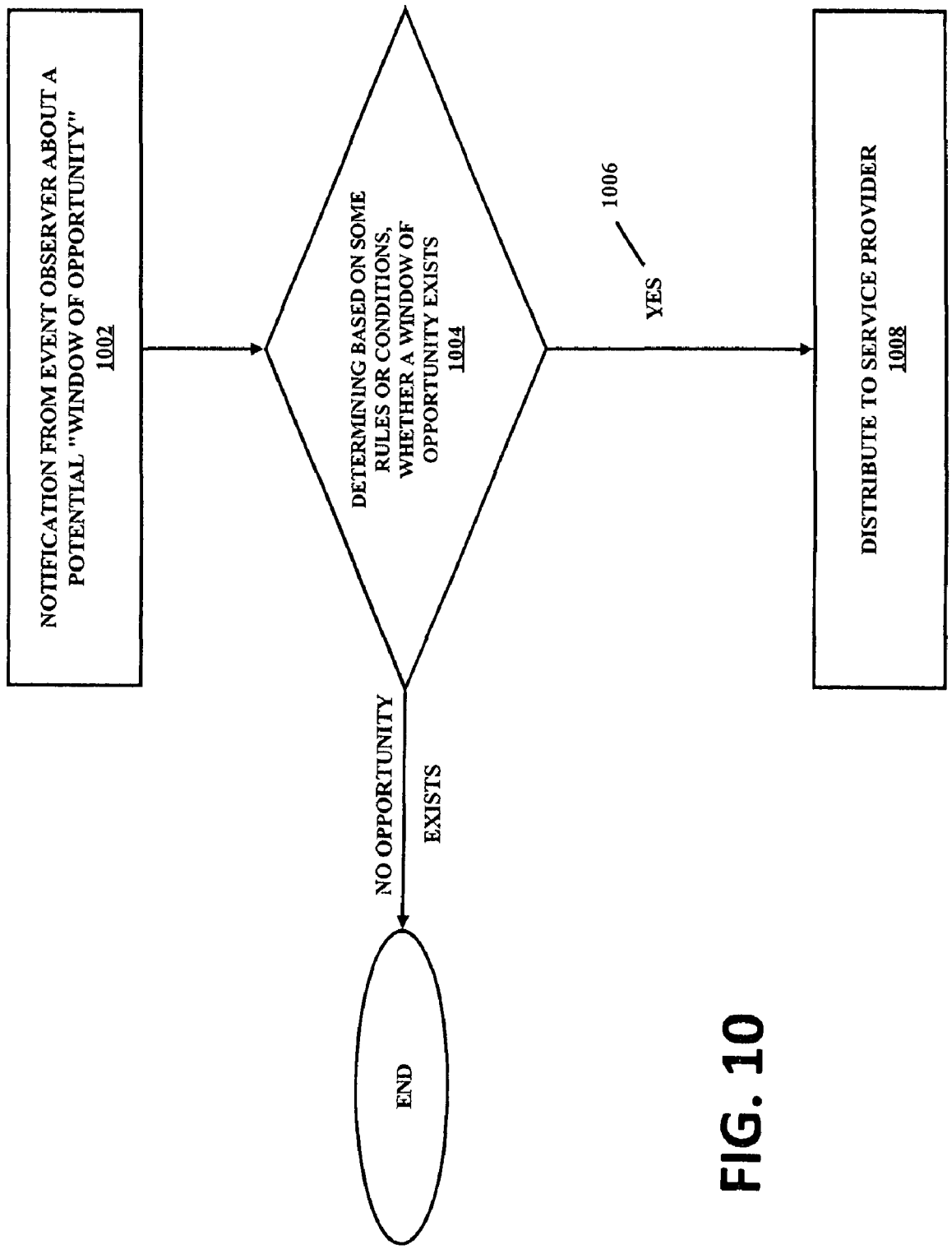
FIG. 10 illustrates the method associated with the window of opportunity detector component.

This component, as illustrated in FIG. 10, receives a notification from the event observer about a potential window of opportunity 1002. It will then determine based on rules or conditions, whether a window of opportunity exists 1004. If a window of opportunity is detected 1006, potential subscribers could be notified 1008. In a further embodiment, the rules and condition would be provided by external service providers. As an example, a newspaper agency could provide a rule to the system to receive a notification, once the ABC airline 160 (as per example above) has a delay of 1 hour.

Overall, the window of opportunity detector will receive potential candidates for a window of opportunity. Based on external rules, a matching would be performed and identified windows of opportunities would be distributed to other service providers, who are interested.

Thus, the present invention enhances sales for service providers by utilizing an opportunistic approach based on an unexpected change in the schedule of services (time, location), which results in blocking of dependents.

The above enhancements for a system and a method for enhancing sales based on unexpected schedule changes and its described functional elements are implemented in various computing environments. For example, the present invention may be implemented on a conventional IBM PC or equivalent, multi-nodal system (e.g. LAN) or networking system (e.g. Internet, WWW, wireless web). All programming and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of network-based programming.

CONCLUSION

A system and method has been shown in the above embodiments for the effective implementation of enhancing sales for service providers by utilizing an opportunistic approach based on an unexpected change in schedule of services (time, location). While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, or specific computing hardware. In addition, the specific iCalendar standard is representative of the preferred embodiment and should not limit the scope of the invention. In addition, the window of opportunity may be interpreted to also include periods of inactivity of potential customers using a schedule-based system.

The invention claimed is:

1. A system comprising a computer memory storing computer readable program code that is executed by a computer to detect windows of opportunities, said computer memory comprising:
   computer readable program code implementing a service provider schema database storing schema descriptions associated with a plurality of data sources, wherein a schema description is associated with a particular data source and identifies data structure and format associated with that particular web based data source;
   computer readable program code implementing a cookie crawler simulating user interactions and extracting data from one or more data sources over a network, wherein data extractions are based on stored schema descriptions stored in said service provider schema database;
   computer readable program code implementing an event retriever receiving extracted data from said cookie crawler and generating an event pair which comprises a target time value and an actual time value associated with a schedule of service;
   computer readable program code implementing an event observer, said event observer receiving said event pairs from said event retriever, calculating the difference between said actual and target time values, and based on one or more rules from a first set of rules, identifying and notifying a window of opportunity detector regarding potential windows of opportunities, wherein each potential window of opportunity defines a time period of customer inactivity; and
   computer readable program code implementing said window of opportunity detector receiving said potential windows opportunities and detecting, based on one or more rules from a set of second rules, if a window of opportunity exists, and if so, matching said detected windows of opportunities with service providers for the purposes of providing a new product or a service separate from said scheduled service.

2. The system of claim 1, wherein said service provider schema database stores schema descriptions in a document type definition (DTD) format.

3. The system of claim 1, wherein said service provider schema database stores schema descriptions in an XML schema format.

4. The system of claim 1, wherein said one or more rules from said set of first rules is a threshold rule, and said potential windows of opportunities are identified based on comparing said difference between said actual and target value against said threshold.

5. The system of claim 1, wherein said one or more rules from said set of second rules are provided externally by said service providers.

6. The system of claim 1, wherein said events are Internet Calendaring and Scheduling Core Object Specification (iCalendar) events.

7. The system of claim 1, wherein said network is any of the following: local area network (LAN), wide area network (WAN), or the Internet.

8. A method for detecting windows of opportunities comprising:
   storing, using a computer comprising a service provider schema database, schema descriptions associated with a plurality of data sources, wherein a schema description is associated with a particular web based data source and identifies data structure and format associated with that particular web based data source;
   simulating, using a computer comprising a cookie crawler, user interactions and extracting data from a particular data source over a network, wherein data extractions are based on a stored schema description associated with said particular data source;
   generating, using a computer comprising an event retriever, an event pair from said extracted data, said event pair comprising a target time value and an actual time value associated with a schedule of service;
   calculating, using a computer comprising an event observer, the difference between said actual and target time values, and based on one or more rules from a first set of rules, identifying potential windows of opportunities, wherein each potential window of opportunity defines a time period of customer inactivity;
   detecting, using a computer comprising a window of opportunity detector and based on one or more rules from a set of second rules, if a window of opportunity exists, and if so, matching said detected window of opportunity with service providers for the purposes of providing a new product or a service separate from said scheduled service.

9. The method of claim 8, wherein said service provider schema database stores schema descriptions in a document type definition (DTD) format.

10. The method of claim 8, wherein said service provider schema database stores schema descriptions in an XML schema format.

11. The method of claim 8, wherein said one or more rules from said set of first rules is a threshold rule, and said potential windows of opportunities are identified based on comparing said difference between said actual and target value against said threshold.

12. The method of claim 8, wherein said one or more rules from said set of second rules are provided externally by said service providers.

13. The method of claim 8, wherein said events are Internet Calendaring and Scheduling Core Object Specification (iCalendar) events.

14. The method of claim 8, wherein said network is any of the following: local area network (LAN), wide area network (WAN), or the Internet.

15. An article of manufacture comprising computer usable medium having computer readable program code embodied therein, said medium comprising:

computer readable program code aiding in storing schema descriptions associated with a plurality of data sources, wherein a schema description is associated with a particular web based data source and identifies data structure and format associated with that particular web based data source;

computer readable program code aiding in simulating user interactions and extracting data from a particular data source over a network, wherein data extractions are based on a stored schema description associated with said particular data source;

computer readable program code aiding in generating an event pair from said extracted data, said event pair comprising a target time value and an actual time value associated with a schedule of service;

computer readable program code aiding in calculating the difference between said actual and target time values, and based on one or more rules from a first set of rules, identifying potential windows of opportunities, wherein each potential window of opportunity defines a time period of customer inactivity;

computer readable program code aiding in detecting, based on one or more rules from a set of second rules, if a window of opportunity exists, and if so, matching said detected window of opportunity with service providers for the purposes of providing a new product or a service separate from said scheduled service.

* * * * *